United States Patent
Datta et al.

(10) Patent No.: US 9,104,919 B2
(45) Date of Patent: *Aug. 11, 2015

(54) MULTI-CUE OBJECT ASSOCIATION

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,974

(22) Filed: Oct. 6, 2014

(65) Prior Publication Data

US 2015/0023560 A1    Jan. 22, 2015

Related U.S. Application Data (63) Continuation of application No. 13/645,831, filed on Oct. 5, 2012, now Pat. No. 8,885,885.

(51) Int. Cl.
*G06K 9/00* (2006.01)
*G06K 9/38* (2006.01)
(Continued)

(52) U.S. Cl.
CPC .............. *G06K 9/00778* (2013.01); *G06K 9/38* (2013.01); *G06T 7/0081* (2013.01); *G06T 7/204* (2013.01); *G06T 7/2053* (2013.01); *G06T 2207/10016* (2013.01); *G06T 2207/30236* (2013.01)

(58) Field of Classification Search
CPC ...... G06K 9/00778; G06K 9/38; G06T 7/204; G06T 2207/30236; G06T 2207/10016
USPC ......... 382/103, 173, 177, 178, 179, 180–190, 382/197, 201
See application file for complete search history.

(56) References Cited

U.S. PATENT DOCUMENTS

2007/0237393 A1* 10/2007 Zhang et al. .................. 382/173
2008/0131010 A1   6/2008 Wilensky
(Continued)

FOREIGN PATENT DOCUMENTS

CN             101404086 B     5/2012

OTHER PUBLICATIONS

Sarah Aboutalib, Towards Using Multiple Cues for Robust Object Recognition, AAMAS, Proceedings of the 6th International Joint Conference on Autonomous Agents and Multiagent Systems, 2007, 8 pp.

(Continued)

*Primary Examiner* — Brian Le
(74) *Attorney, Agent, or Firm* — Patrick J. Daugherty; Driggs, Hogg, Daugherty & Del Zoppo Co., LPA (57) ABSTRACT

Multiple discrete objects within a scene image captured by a single camera track are distinguished as un-labeled from a background model within a first frame of a video data input. Object position, object appearance and/or object size attributes are determined for each of the blobs, and costs determined to assign to existing blobs of existing object tracks as a function of the determined attributes. The unlabeled object blob that has a lowest cost of association with any of the existing object tracks is labeled with the label of that track having the lowest cost, said track is removed from consideration for labeling remaining un-labeled object blobs, and the process iteratively repeated until each of the track labels have been used to label one of the un-labeled blobs.

20 Claims, 3 Drawing Sheets

(51) Int. Cl.
*G06T 7/20* (2006.01)
*G06T 7/00* (2006.01)

(56) References Cited

U.S. PATENT DOCUMENTS

| | | |
|---|---|---|
| 2011/0164152 A1 | 7/2011 | Hong et al. |
| 2012/0039535 A1 | 2/2012 | Wilensky et al. |
| 2012/0327172 A1 | 12/2012 | El-Saban et al. |
| 2013/0230237 A1* | 9/2013 | Schlosser et al. .............. 382/164 |
| 2013/0243313 A1* | 9/2013 | Civit et al. .................... 382/164 |
| 2013/0329987 A1* | 12/2013 | Gong ............................ 382/159 |

OTHER PUBLICATIONS

James Humphreys et al, Multiple Object Tracking Using a Neural Cost Function, Image and Vision Computing, May 11, 2008, pp. 1-20.

Andreas Girgensohn et al, DOTS: Support for Effective Video Surveillance, Proceedings of the ACM International Multimedia Conference and Exhibition, 2007, 10 pp.

Bo Wu et al, Detection and Tracking of Multiple, Partially Occluded Humans by Bayesian Combination of Edgelet Based Part Detectors, International Journal of Computer Vision, vol. 75, Issue 3, Nov. 2007, pp. 247-277.

U.S. Appl. No. 13/645,831, filed Oct. 5, 2012; Notice of Allowance Dated Jul. 7, 2014.

\* cited by examiner

|    | T1 | T2 | T3 | T4 |
|----|----|----|----|----|
| B1 | $a_{11}$ | $a_{12}$ | $a_{13}$ | $a_{14}$ |
| B2 | $a_{21}$ | $a_{22}$ | $a_{23}$ | $a_{24}$ |
| B3 | $a_{31}$ | $a_{32}$ | $a_{33}$ | $a_{34}$ |

MULTI-CUE OBJECT ASSOCIATION

FIELD OF THE INVENTION

Embodiments of the present invention relate to applying computer vision techniques to automatically differentiate and track multiple objects within video image data.

BACKGROUND

Automated video analytic systems may use background subtraction (BGS) and processes to distinguish visible foreground objects of interest relative to other visual elements determined to be background data within the video data, and to thereby enable detection and observation of said foreground objects in processed video data inputs. Such information processing systems may receive images or image frame data captured by video cameras or other image capturing devices, wherein individual frames of video data are processed or analyzed by an object detection system in the information processing system to identify and track the presence and movement of objects detected within the video data over time.

However, automated background subtraction systems may perform poorly due to complexities in interpreting image data attributes. Accurately distinguishing and tracking multiple objects present within image data, such as a vehicles or pedestrians in a street scene, may be challenging due to large variability in amounts of reflected light over time generated by changing weather conditions, for example due to progressive transitions between sunny, cloudy, nighttime lighting, and fast and intermittent changes via transient moving cloud shadows, etc. Temporary occlusions caused by other moving objects may also pose problems in tracking individual objects. A wide variety of reflected or occluded lighting profiles must be processed that may be caused by different moving objects and transient cloud shadows, wherein each may move at different speeds of movement relative to the video cameras. Even a minor change in lighting with respect to strong visual textures may cause incorrect foreground classification in video analytic systems. Thus, high rates of false positive detections, or low rates of accuracy in detecting true events, may generally limit the usefulness and trustworthiness of such systems in finding and tracking objects of interest in video data in real-time, or to otherwise meet constraints imposed in performing under real world conditions.

BRIEF SUMMARY

In one embodiment of the present invention, a method to track multiple discrete objects within a scene image captured by a single camera includes distinguishing foreground object bounding box blobs from a background model within a first frame of a video data input from a single camera view via a background subtraction process, and initializing each of the foreground object bounding box blobs as un-labeled. Object position and object appearance and/or object size attributes are determined for each of the un-labeled object blobs, and costs for assigning each of the un-labeled object blobs to existing blobs of existing object tracks are determined as a function of the determined attributes and combined to generate respective combination costs of associating each of the un-labeled object blobs with each of the existing blobs of the existing tracks. The un-labeled object blob that has a lowest combined cost of association with any of the existing object tracks is labeled with the label of the tracks having the lowest combined cost of association, and this track is removed from consideration for labeling the remaining others of the un-labeled object blobs. This process is iteratively repeated, labeling each of remaining un-labeled object blobs that have the lowest combined cost of association with any of the remaining tracks (those that have not yet been removed for consideration) with each iteration, until each of the track labels have been used to label one of the un-labeled object blobs.

In another embodiment, a method provides a service for tracking multiple discrete objects within a scene image captured by a single camera by providing a computer infrastructure being operable to distinguish foreground object bounding box blobs from a background model within a first frame of a video data input from a single camera view via a background subtraction process, and initializing each of the foreground object bounding box blobs as un-labeled. Object position and object appearance and/or object size attributes are determined for each of the un-labeled object blobs, and costs for assigning each of the un-labeled object blobs to existing blobs of existing object tracks are determined as a function of the determined attributes and combined to generate respective combination costs of associating each of the un-labeled object blobs with each of the existing blobs of the existing tracks. The un-labeled object blob that has a lowest combined cost of association with any of the existing object tracks is labeled with the label of the tracks having the lowest combined cost of association, and this track is removed from consideration for labeling the remaining others of the un-labeled object blobs. The computer infrastructure iteratively repeats this process until each of the track labels have been used to label one of the un-labeled object blobs, by labeling each of the remaining un-labeled object blobs that have the lowest combined cost of association with any of the remaining tracks (those that have not yet been removed for consideration) with each iteration.

In another embodiment, a system has a processor, computer readable memory and a tangible computer-readable storage medium with program instructions, wherein the processor, when executing the stored program instructions, distinguishes foreground object bounding box blobs from a background model within a first frame of a video data input from a single camera view via a background subtraction process, and initializing each of the foreground object bounding box blobs as un-labeled. Object position and object appearance and/or object size attributes are determined for each of the un-labeled object blobs, and costs for assigning each of the un-labeled object blobs to existing blobs of existing object tracks are determined as a function of the determined attributes and combined to generate respective combination costs of associating each of the un-labeled object blobs with each of the existing blobs of the existing tracks. The un-labeled object blob that has a lowest combined cost of association with any of the existing object tracks is labeled with the label of the tracks having the lowest combined cost of association, and this track is removed from consideration for labeling the remaining others of the un-labeled object blobs. The processor iteratively repeats this process until each of the track labels have been used to label one of the un-labeled object blobs, by labeling each of remaining un-labeled object blobs that have the lowest combined cost of association with any of the remaining tracks (those that have not yet been removed for consideration) with each iteration.

In another embodiment, an article of manufacture has a tangible computer-readable storage medium with computer readable program code embodied therewith, the computer readable program code comprising instructions that, when executed by a computer processor, cause the computer processor to distinguish foreground object bounding box blobs from a background model within a first frame of a video data input from a single camera view via a background subtraction process, and initializing each of the foreground object bounding box blobs as un-labeled. Object position and object appearance and/or object size attributes are determined for each of the un-labeled object blobs, and costs for assigning each of the un-labeled object blobs to existing blobs of existing object tracks are determined as a function of the determined attributes and combined to generate respective combination costs of associating each of the un-labeled object blobs with each of the existing blobs of the existing tracks. The un-labeled object blob that has a lowest combined cost of association with any of the existing object tracks is labeled with the label of the tracks having the lowest combined cost of association, and this track is removed from consideration for labeling the remaining others of the un-labeled object blobs. The processor iteratively repeats this process until each of the track labels have been used to label one of the un-labeled object blobs, by labeling each of the remaining un-labeled object blobs that have the lowest combined cost of association with any of the remaining tracks (those that have not yet been removed for consideration) with each iteration.

BRIEF DESCRIPTION OF THE SEVERAL
VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Video analytics systems may use background subtraction (BGS) to distinguish foreground objects of interest from background models defined with respect to visual data in video input data. Such BGS systems are being increasingly deployed to determine and track pedestrian and vehicle movements and activities in a variety of different scenes and contexts, including public roadways, mass transit stations, etc. Through automated BGS analysis, the capabilities of human monitors of these areas may be greatly extended, in some examples allowing one person to monitor increasing numbers of cameras and scenes for public safety issues associated with such object movements.

BGS video analytics applications deployed to track vehicle movements through roadways may be expected to perform under rigorous or demanding conditions. Accurately distinguishing and tracking multiple objects present within any given image frame may be challenging within realistic image analysis constraints. The BGS system must accurately distinguish different foreground blob bounding boxes from background models by processing image frames that may each comprise large relative variability in amounts of reflected light over time. Environmental variations may impact the quality of image data in any given image frame, for example the same scene may experience a wide variety of seasonal weather conditions such as snow, rain, thunderstorms and lightning that have different levels and qualities of scene illumination. The same scene may also have a variety of activity levels, which may pose complexities in accurate object tracking. For example, a street scene that typically comprises only a few vehicle objects late at night may be packed with many more vehicles during a commuting rush-hour, wherein a large number of objects may be moving with different movement characteristics.

BGS system deployments may have to meet efficiency requirements, for example to be able to process 15 frames per second for at least 12 to 16 cameras simultaneously at any one time. Such requirements may stretch the computation and memory resources available and needed to perform the object identification and tracking tasks, and real-world limitations on asset deployment may force BGS systems to make policy choices and compromises that result in unacceptable rates of false positive detections or accuracy in detecting true events, which limits the usefulness and trustworthiness of prior art BGS systems in finding and tracking objects of interest in video data in real-time, or to otherwise meet constraints imposed in performing under real world conditions.

Figure 1:
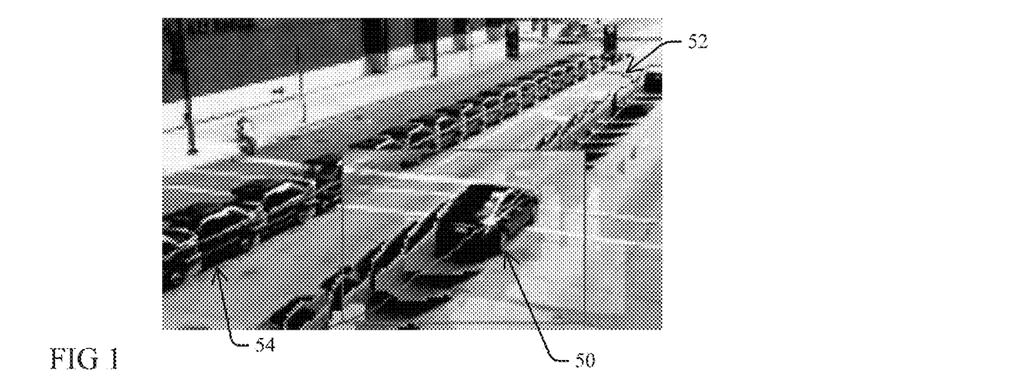
FIG. 1 is a photographic illustration of an example of tracking a vehicle through a single camera image scene using an automated background subtraction system.

Accurately labeling or associating each of a group of different foreground objects in one frame to the correct objects appearing in a previous frame presents challenges. Prior methods generally determine a position cost to determine whether the bounding box blobs detected in any given image frame represent the correct, same objects determined in a previous frame, wherein their relative positions must be offset by a distance cost that meets a rule or a minimum and/or maximum speed of travel threshold for the object. FIG. 1 illustrates an example of tracking a vehicle through a single camera image scene of a two-lane, two-way traffic roadway using an automated BGS system. Each of the individual vehicle images represent a different video frame acquired at a different time in a video data input from this single camera view. In each frame, a foreground bounding box object blob of a vehicle object is distinguished from a background model of the image data.

To determine whether the vehicle bounding box blob detected in any given image frame of FIG. 1 represents the same vehicle blob determined in a previous frame, the prior art method applies one or more if-then rules or thresholds to the respective frame data. Generally, their relative positions must be offset by a distance cost that meets a rule or a minimum and/or maximum speed of travel threshold for the object of interest, though other rules and thresholds may also be applied. For example, the prior art BGS system may assign a blob in a current frame the same label (or other identity criteria) used to identify a previously detected blob in a prior video frame if the object motion of the current blob relative to the previous frame blob is less than a 15 pixel threshold, or if a position cost determined in associating the position of the current blob with the position of a blob in a previous frame is within a maximum cost threshold.

In the present example, the displacement distance cost between the bounding box blobs determined for each of consecutively acquired frames for the vehicle 50 traveling in the right-hand lane away from the camera view meet a prior art distance cost threshold with respect to a next or prior consecutive frame, indicating that each of the frame foreground blobs located in this right-hand lane are in fact the same vehicle 50 travelling through said lane over time. Accordingly, a prior art BGS system labels each of these right-hand lane vehicle image blobs with a common, unique vehicle identifier label and further associates the determined vehicle 50 with a track 52 described by the motion of the vehicle 50 through the scene image frames. Thus far the system has correctly tracked and identified the vehicle 50 as travelling along track 52 outbound from the camera perspective in the right-hand lane.

However, as this first vehicle 50 is leaving the scene at the top right quadrant of the image, another second vehicle 54 enters the image scene in the same quadrant of the image but in the adjacent left-hand, oncoming traffic lane. In a prior art BGS system, the positions of the vehicles 50 and 54 may be proximate enough to each other in consecutive frames to meet the prior art object position cost threshold or if-then cost rule, wherein the prior art BGS mistakenly conflates the two different vehicles and erroneously labels the second vehicle 54 with the label of the first vehicle 50 as well as the track 52 associated with the first vehicle 50. Therefore, rather than report that a second, different vehicle 52 is travelling properly in its own new track in the left-hand lane, the prior art BGS system erroneously determines that the track 52 of the movement of the first vehicle 50 defines an illegal U-turn and extends back toward the bottom left quadrant of the image. Accordingly, the prior art BGS system issues a false alert that the first vehicle 50 has made a U-turn, when in fact no U-turn has occurred.

Figure 2:
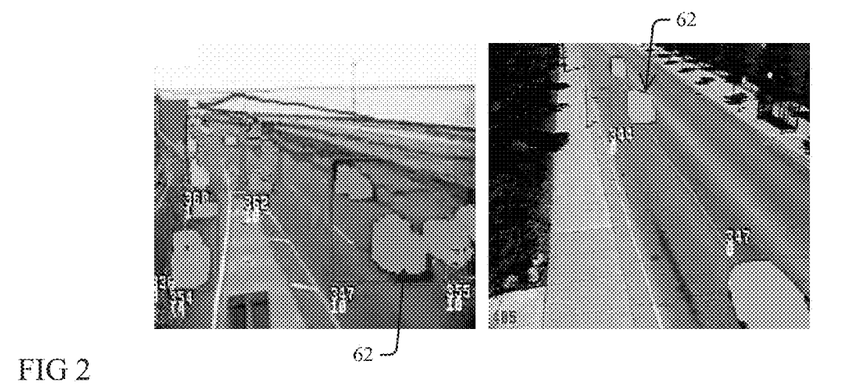
FIG. 2 is a photographic illustration of an object-track association problem in automated background subtraction processes.

FIG. 2 illustrates an "object-track association" problem in prior art processes wherein multiple, distinct and different vehicle objects 62 are miss-categorized by a video analytics system as constituting one unitary, labeled bounding box object, for example the two vehicle blobs 62 labeled as bounding box object "344" in the right image, and the three vehicle blobs 62 labeled as bounding box object "355" in the left image, and wherein said bounding boxes are erroneously tracked and labeled as individual vehicles. Again, this error occurs due to the position costs of associating the multiple objects meeting the applicable if-then rules or thresholds used in the prior art processes.

Figure 3:
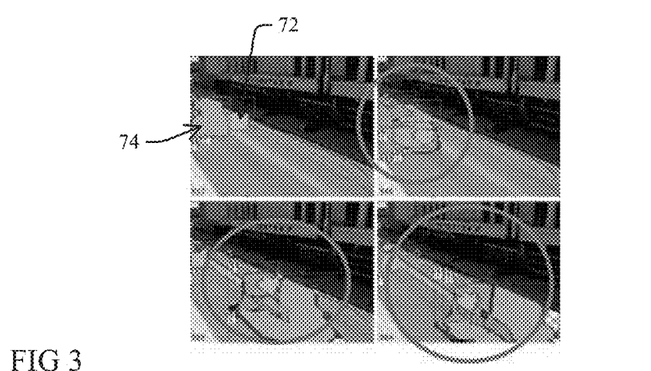
FIG. 3 is a photographic illustration of a split/merge object-track association problem in automated background subtraction processes.

FIG. 3 illustrates a "split/merge" determination error generated by prior art BGS systems. The upper left of the four images is a first of four sequential video frames and shows a first vehicle 72 next to a second, larger truck 74, wherein one is distinguishable from the other and may be separately labeled and tracked, and wherein each is travelling in opposite directions in their respective lanes on a two-lane, two-way traffic roadway. However, in the subsequent frame images, the larger truck 74 occludes the view of the adjacent vehicle 72 as they pass by each other, and the system assumes that the smaller vehicle 72 is moving with the larger truck 74 on a common track, essentially combining the vehicle 72 into the truck 74 for tracking and labeling purposes and causing the system to erroneously report that the first vehicle is moving in a direction opposite of its true path.

Variations in image scene illuminations, such as shadows and changing environmental conditions, may also cause "ghost track" problems, wherein a lighting change is interpreted to be an object within a discrete portion of the same image data, such as a rectangular box within the image data within the scene having a size of an anticipated object of interest such as a vehicle, pedestrian, abandoned object, etc., although no object is present within the scene. Prior art BGS systems may accordingly track such false or "ghost" object determinations although there is actually nothing of interest within the image data at that time.

Figure 4:
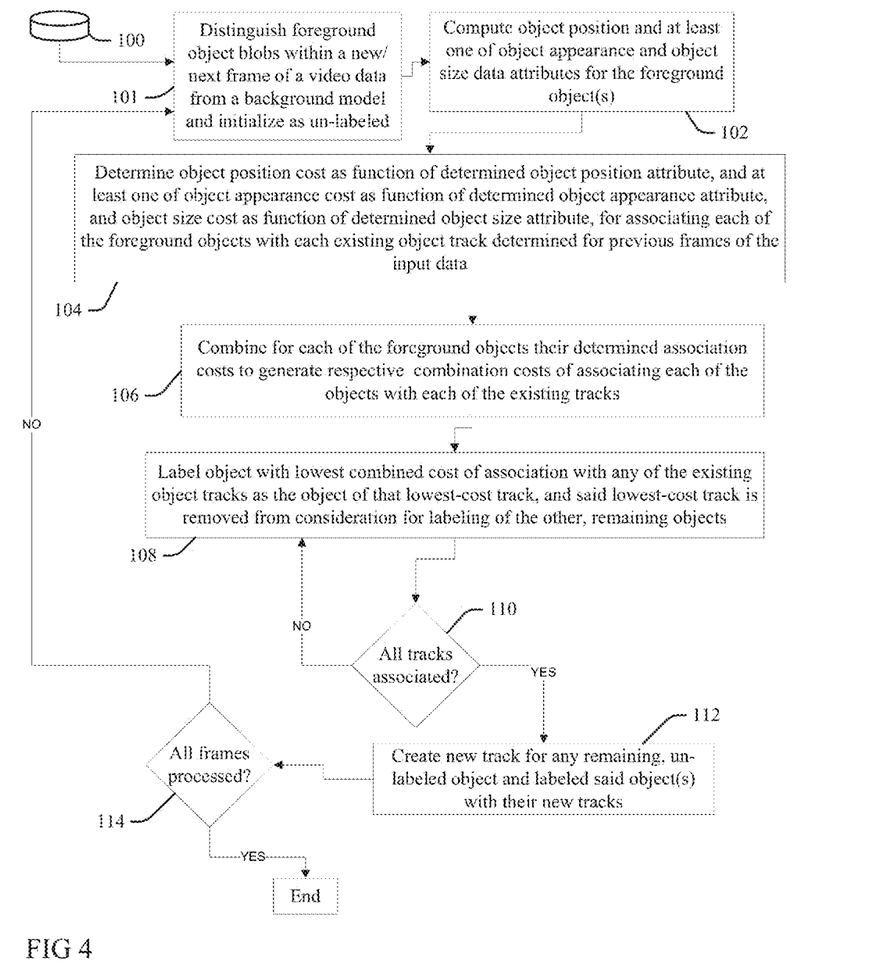
FIG. 4 is a block diagram illustration of a method or process for tracking of multiple discrete objects within a scene image captured by a single camera according to the present invention.

FIG. 4 illustrates an embodiment of the present invention that provides for improved tracking of multiple discrete objects within a scene image captured by a single camera. At 101 a plurality of foreground object bounding box blobs are distinguished from a background model within a frame of a video data input from a single camera view 100 via a background subtraction (BGS) process and initialized as "unlabeled" or otherwise unassociated with any known previous objects or tracks in prior frame data. At 102 object positions and at least one of object appearance, object size data attributes or other image attributes are computed for each of the foreground objects blobs.

At 104 a plurality of different attribute costs are determined for assigning each of the foreground object blobs determined at 101 to the blobs of any existing object tracks that were determined by performing BGS processes on previous frames of the input data 100. The plurality of costs comprise an object position cost determined as a function of the object position attribute determined at 102, and at least one of an object appearance cost determined as a function of the object appearance attribute determined at 102, and an object size cost determined as a function of the object size attribute determined at 102. Still other attributes and costs of association or distance costs may be practiced, such as specific color spectrum costs, template shape correspondence (for example, matching a specific automobile, truck, bicycle or pedestrian shape template). However, each embodiment computes an object position cost and at least one other attribute cost for associating each blob in the current frame to each object track present in a previous frame of the video data input 100.

The track association costs determined at 104 are combined at 106 for each of the plurality of foreground objects to generate respective combination costs of associating each of the objects with each of the existing tracks. As will be appreciated by one skilled in the art, combining the different costs at 106 may comprise differentially weighting the respective costs as specified or required by a user.

Figure 5:
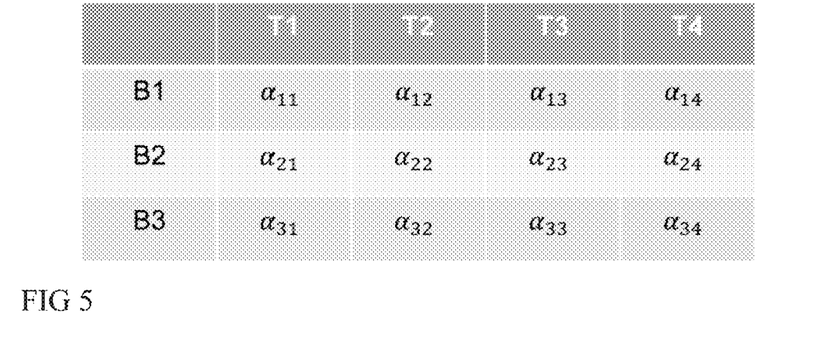
FIG. 5 provides a tabular illustration of a matrix of combination costs for associating different respective bounding boxes with different existing object tracks according to the present invention.

At 108 the object that has a lowest combined cost of association with any of the existing object tracks is labeled as the object of that lowest-cost track, and said lowest-cost track is removed from consideration for labeling of the other, remaining objects. More particularly, FIG. 5 illustrates a matrix wherein the left column lists three different bounding boxes B1, B2 and B3 representing three different objects blobs that have been discerned within an image frame of a video data input at 101 of FIG. 4. Each of the columns T-1 through T4 represent different existing tracks observed as traversed by bounding box objects within previous frames of the video data by the video analytics system. The matrix is populated with individual alpha values that each represent the combination costs generated at 106 of FIG. 4 for associating each of the respective blobs B1 through B3 with each of the respective, intersecting tracks T-1 through T4. Thus, at 108 the lowest of the alpha values is identified, and the bounding box blobs B1, B2 or B3 of that lowest alpha value is labeled with the identity of a bounding box object associated with the intersecting tracks T1, T2 or T3 in previous frame data.

Referring again to FIG. 4, the process then iteratively progresses through each of the other tracks until at 110 each of the tracts are associated (used as a label) with one of the objects within the frame, by labeling a next remaining (as of yet un-labeled) object at 108 that has a current, lowest generated combination cost of association with one of the remaining un-associated tracks (one that none of the objects has yet been labeled with), and removing this next track from further consideration, etc. Thus, with each successive iteration, one fewer track is available for consideration for labeling and assignment. At 112 a new track is created for any remaining, un-labeled ones of the plurality of objects, and said object(s) labeled with their new tracks. The existing tracks and new tracks are then used for labeling objects determined in any subsequent frames of the video data at 114, until all frames have been processed.

Thus, for each new frame, video data each of bounding box blobs determined via background subtraction methods are assigned to their own distinct tracks, which prevents improperly combining multiple objects into a common or same existing object track via the split-merge, object-track association and U-turn problem situations described above with respect to the prior art. This is in contrast to the "if-then" and threshold rule applications of the prior art, wherein multiple blobs may qualify for assignment to a single track and thus be improperly merged, etc. In the present embodiments, each blob is instead determined as another image of an existing, singular object and uniquely belonging to and continuing an existing track of that existing object; or as a new object, and a new track is created or initiated for the new object (which may perhaps continue a previously unseen or unrecognized tract), as a function of the determining multiple costs including an object appearance cost, and one or more of object position, object size or other attribute association costs.

Embodiments of the invention provide improved efficiencies by using greedy Hungarian optimization methodology instead of the "if-then" and threshold application methodology of the prior art. By labeling the strongest (lowest-cost) associations first, then progressively removing the strongest blob/track association combinations from possibilities for consideration for determining each of the next blob/track combinations, and so on until all blob and track association determinations are made, fewer comparisons and decisions need be made at each iterative step in the process. This may progressively reduce computing demands and increase the speed of association labeling at each iterative step.

Embodiments are also extensible to include various constraints, thereby providing constraint-based object association. More particularly, some embodiments generate the combination costs at 106 of FIG. 4 by imposing constraints on generating certain of the combination costs as a function of knowledge about the three-dimensional geometry inherent in the scene depicted within the video data. For example, it may be known that the right side of the single camera image scene necessarily contains only vehicle objects in an outbound lane of a limited-access highway that is oriented vertically on the right side of the image, and therefore that such vehicle objects can only move in a vertical direction from bottom to top of the screen on the right side of the image, and cannot be associated with an object track that travels downward on the left side of the image (which would necessarily be a path of a vehicle on the other side of the highway with traffic flowing in the opposite direction), or otherwise non-vertically into the upper or lower left quadrants of the image. In another example, via knowledge that the upper right quadrant of the image comprises a view of a far end of railway platform oriented diagonally toward the lower left quadrant to a part of the railway platform more proximate to the camera, it may be inferred that it may be physically impossible for a pedestrian object to travel a track traversing the distances involved to move from the upper right to the lower left quadrant in an observed time (over a certain number of image frames). Knowledge of intervening physical obstructions may also render some track associations impossible.

In order to avoid mistakenly labeling objects with such unlikely, improbable or impossible tract associations, embodiments of the present invention may allow for manual or automatic setting of constraints to prevent such associations. For example, an infinite cost factor may be introduced into certain combined association cost alpha values in the matrix of FIG. 5, so that the alpha costs in these matrix positions go to infinity and thereby prevent selection of an intersecting track with a given bounding box blob via the lowest-cost selection process at 108 of FIG. 4. By increasing certain association costs to infinity, the video analytic system embodiment cannot mistakenly make a geographically impossible object and track association and labeling.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
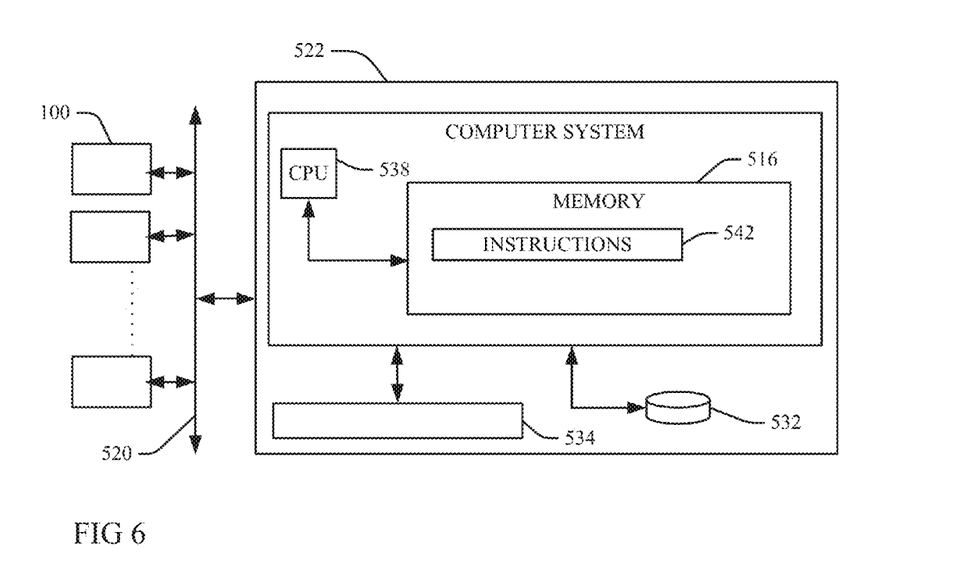
FIG. 6 is a block diagram illustration of a computer system implementation of an embodiment of the present invention.

Referring now to FIG. 6, an exemplary computerized implementation of an embodiment of the present invention includes a computer system or other programmable device 522 in communication with one or more sources of single-camera view video frame data of scene imagery (cameras, storage devices, servers, clients, programmable devices, applications, etc.). Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit (or processor) 538, cause the processing unit 538 to track multiple discrete objects within a scene image captured by a single camera by computing multiple, different costs for associating each of the objects with each of a plurality of objects determined within previous frame data, and iteratively choosing objects with a lowest combined cost of association and removing each from consideration for labeling of the other, remaining objects, as described above with respect to FIGS. 4 and 5.

Embodiments of the present invention may also perform process steps of the invention on a subscription, advertising, and/or fee basis. That is, a service provider could offer to integrate computer-readable program code into the computer system 522 to enable the computer system 522 to track multiple discrete objects within a scene image captured by a single camera by computing multiple, different costs for associating each of the objects with each of a plurality of objects determined within previous frame data, and iteratively choosing objects with a lowest combined cost of association and removing each from consideration for labeling of the other, remaining objects, as described above with respect to FIGS. 4 and 5. The service provider can create, maintain, and support, etc., a computer infrastructure such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to track multiple discrete objects within a scene image captured by a single camera, the method comprising:
   distinguishing a plurality of foreground object bounding box blobs from a background model within a first frame of a video data input from a single camera view via a background subtraction process;
   initializing each of the plurality of foreground object bounding box blobs as un-labeled;
   determining at least one image attribute for each of the un-labeled object blobs;
   determining at least one attribute cost for assigning each of the un-labeled object blobs to existing blobs of each of at least one existing object track determined by performing a background subtraction process on a previous frame of the video data input;
   labeling one of the un-labeled object blobs that has a lowest cost of association with any of the existing object tracks with a label of one of the existing tracks that has the lowest cost of association;
   removing the one track of the label of the labeled object blob from consideration for labeling remaining others of the un-labeled object blobs; and
   iteratively repeating steps of labeling each of the remaining ones of the un-labeled object blobs that each have a lowest cost of association with any of the existing object tracks of the remaining ones of the existing tracks that have not been removed for consideration, and removing the tracks of the labels of the labeled object blobs from consideration for labeling of remaining others of the un-labeled object blobs, until the labels of each of the tracks have been used to label ones of the un-labeled object blobs.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the steps of distinguishing the plurality of foreground object bounding box blobs from the background model, initializing each of the plurality of foreground object bounding box blobs as un-labeled, determining the at least one image attribute for each of the un-labeled object blobs, determining the at least one attribute cost for assigning each of the un-labeled object blobs to the existing blobs of each of the at least one existing object track, labeling the one of the un-labeled object blobs that has the lowest cost of association with any of the existing object tracks with the label of one of the existing tracks that has the lowest cost of association, removing the one track of the label of the labeled object blob from consideration for labeling remaining others of the un-labeled object blobs and iteratively repeating said steps of labeling each of the remaining ones of the un-labeled object blobs that each have the lowest cost of association with any of the existing object tracks of the remaining ones of the existing tracks that have not been removed for consideration and removing the tracks of the labels of the labeled object blobs from consideration for labeling of remaining others of the un-labeled object blobs until the labels of each of the tracks have been used to label ones of the un-labeled object blobs.

3. The method of claim 1, wherein the at least one image attribute is a plurality of different image attributes comprising an object position attribute and at least one of an object appearance attribute and an object size attribute;
   wherein the at least one attribute cost is a plurality of different attribute costs comprising an object position cost determined as a function of the determined object position attribute, and at least one of an object appearance cost determined as a function of the determined object appearance attribute, and an object size cost determined as a function of the determined object size attribute; and
   the method further comprising:
   combining the plurality of the different attribute costs determined for each of the plurality of un-labeled objects blobs to generate respective combination costs of associating each of the un-labeled object blobs with each of the existing blobs of the existing tracks, wherein the lowest cost of association used for the step of labeling the one of the un-labeled object blobs with any of the existing object tracks is a lowest of the combination costs.

4. The method of claim 3, further comprising:
   creating a new track and a new label for each of any remaining un-labeled object blobs, and labeling each of said remaining un-labeled object blobs with the label of their new, created tracks; and
   using the existing tracks and the new tracks for labeling object blobs determined in frames of the video data that are subsequent in time to the first frame.

5. The method of claim 4, further comprising iteratively repeating the steps of the claim until all of a plurality of frames of the video data input that are subsequent to the first frame have been processed.

6. The method of claim 4, wherein the different image attributes determined for each of the un-labeled object blobs comprise the object position attribute, the object appearance attribute and the object size attribute; and
   wherein the step of determining the plurality of different attribute costs for assigning each of the un-labeled object blobs to the existing blobs comprises determining the object appearance cost as the function of the determined object appearance attribute, and determining the object size cost as the function of the determined object size attribute.

7. The method of claim 6, wherein the step of combining the plurality of different determined attribute costs for each of the plurality of un-labeled object blobs to generate the respective combination costs of associating each of the un-labeled object blobs with each of the existing blobs of the existing tracks further comprises differentially weighting one of the object position cost, the object appearance cost and the object size cost higher than another of the object position cost, the object appearance cost and the object size cost.

8. The method of claim 6, wherein the step of combining the plurality of different attribute costs determined for each of the plurality of un-labeled objects blobs to generate the respective combination costs of associating each of the un-labeled object blobs with each of the existing blobs of the existing tracks, further comprises:
 imposing a constraint on generating a combination cost of associating a specified one of the un-labeled object blobs with a specified one of the existing blobs of the existing tracks as a function of knowledge about a three-dimensional geometry of a scene depicted within the video data.

9. The method of claim 8, wherein the step of imposing the constraint on generating the combination cost of associating the specified one of the un-labeled object blobs with the specified one of the existing blobs of the existing tracks comprises:
 introducing an infinite cost factor that causes the generated combination cost of associating the specified one of the un-labeled object blobs with the specified one of the existing blobs of the existing tracks to go to infinity.

10. A system, comprising:
 a processor;
 a computer readable memory in circuit communication with the processor; and
 a computer-readable storage medium in circuit communication with the processor;
 wherein the processor, when executing program instructions stored on the computer-readable storage medium via the computer readable memory:
 distinguishes a plurality of foreground object bounding box blobs from a background model within a first frame of a video data input from a single camera view via a background subtraction process;
 initializes each of the plurality of foreground object bounding box blobs as un-labeled;
 determines at least one image attribute for each of the un-labeled object blobs;
 determines at least one attribute cost for assigning each of the un-labeled object blobs to existing blobs of each of at least one existing object track determined by performing a background subtraction process on a previous frame of the video data input;
 labels one of the un-labeled object blobs that has a lowest cost of association with any of the existing object tracks with a label of one of the existing tracks that has the lowest cost of association;
 removes the one track of the label of the labeled object blob from consideration for labeling remaining others of the un-labeled object blobs; and
 iteratively repeats the labeling each of the remaining ones of the un-labeled object blobs that each have a lowest cost of association with any of the existing object tracks of the remaining ones of the existing tracks that have not been removed for consideration, and the removing the tracks of the labels of the labeled object blobs from consideration for labeling of remaining others of the un-labeled object blobs, until the labels of each of the tracks have been used to label ones of the un-labeled object blobs.

11. The system of claim 10, wherein the at least one image attribute is a plurality of different image attributes comprising an object position attribute and at least one of an object appearance attribute and an object size attribute;
 wherein the at least one attribute cost is a plurality of different attribute costs comprising an object position cost determined as a function of the determined object position attribute, and at least one of an object appearance cost determined as a function of the determined object appearance attribute, and an object size cost determined as a function of the determined object size attribute;
 wherein the processor executes the program instructions stored on the computer-readable storage medium via the computer readable memory and thereby further combines the plurality of the different attribute costs determined for each of the plurality of un-labeled objects blobs to generate respective combination costs of associating each of the un-labeled object blobs with each of the existing blobs of the existing tracks; and
 wherein the lowest cost of association used for the step of labeling the one of the un-labeled object blobs with any of the existing object tracks is a lowest of the combination costs.

12. The system of claim 11, wherein the processor executes the program instructions stored on the computer-readable storage medium via the computer readable memory and thereby further:
 creates a new track and a new label for each of any remaining un-labeled object blobs, and labels each of said remaining un-labeled object blobs with the label of their new, created tracks; and
 uses the existing tracks and the new tracks for labeling object blobs determined in frames of the video data that are subsequent in time to the first frame.

13. The system of claim 12, wherein the different image attributes determined for each of the un-labeled object blobs comprise the object position attribute, the object appearance attribute and the object size attribute; and
 wherein the processor executes the program instructions stored on the computer-readable storage medium via the computer readable memory and thereby further determines the plurality of different attribute costs for assigning each of the un-labeled object blobs to the existing blobs by determining the object appearance cost as the function of the determined object appearance attribute, and determining the object size cost as the function of the determined object size attribute.

14. The system of claim 13, wherein the processor executes the program instructions stored on the computer-readable storage medium via the computer readable memory and thereby further combines the plurality of different determined attribute costs for each of the plurality of un-labeled objects blobs to generate the respective combination costs of associating each of the un-labeled object blobs with each of the existing blobs of the existing tracks by differentially weighting one of the object position cost, the object appearance cost and the object size cost higher than another of the object position cost, the object appearance cost and the object size cost.

15. The system of claim 14, wherein the processor executes the program instructions stored on the computer-readable storage medium via the computer readable memory and thereby further imposes a constraint on generating a combination cost of associating a specified one of the un-labeled object blobs with a specified one of the existing blobs of the existing tracks as a function of knowledge about a three-dimensional geometry of a scene depicted within the video data.

16. The system of claim 15, wherein the processor executes the program instructions stored on the computer-readable storage medium via the computer readable memory and thereby further imposes the constraint by introducing an infinite cost factor that causes the generated combination cost of associating the specified one of the un-labeled object blobs with the specified one of the existing blobs of the existing tracks to go to infinity.

17. A computer program product for tracking multiple discrete objects within a scene image captured by a single camera, the computer program product comprising:
 a computer readable hardware storage device having computer readable program code embodied therewith, the computer readable program code comprising instructions for execution by a processor that cause the processor to
 distinguish a plurality of foreground object bounding box blobs from a background model within a first frame of a video data input from a single camera view via a background subtraction process;
 initialize each of the plurality of foreground object bounding box blobs as un-labeled;
 determine at least one image attribute for each of the un-labeled object blobs;
 determine at least one attribute cost for assigning each of the un-labeled object blobs to existing blobs of each of at least one existing object track determined by performing a background subtraction process on a previous frame of the video data input;
 label one of the un-labeled object blobs that has a lowest cost of association with any of the existing object tracks with a label of one of the existing tracks that has the lowest cost of association;
 remove the one track of the label of the labeled object blob from consideration for labeling remaining others of the un-labeled object blobs; and
 iteratively repeat labeling each of the remaining ones of the un-labeled object blobs that each have a lowest cost of association with any of the existing object tracks of the remaining ones of the existing tracks that have not been removed for consideration, and removing the tracks of the labels of the labeled object blobs from consideration for labeling of remaining others of the un-labeled object blobs, until the labels of each of the tracks have been used to label ones of the un-labeled object blobs.

18. The computer program product of claim 17, wherein the at least one image attribute is a plurality of different image attributes comprising an object position attribute and at least one of an object appearance attribute and an object size attribute;
 wherein the at least one attribute cost is a plurality of different attribute costs comprising an object position cost determined as a function of the determined object position attribute, and at least one of an object appearance cost determined as a function of the determined object appearance attribute, and an object size cost determined as a function of the determined object size attribute;
 wherein the computer readable program code instructions for execution by the processor further cause the processor to combine the plurality of the different attribute costs determined for each of the plurality of un-labeled objects blobs to generate respective combination costs of associating each of the un-labeled object blobs with each of the existing blobs of the existing tracks; and
 wherein the lowest cost of association used for the step of labeling the one of the un-labeled object blobs with any of the existing object tracks is a lowest of the combination costs.

19. The computer program product of claim 18, wherein the computer readable program code instructions for execution by the processor further cause the processor to:
 create a new track and a new label for each of any remaining un-labeled object blobs, and labels each of said remaining un-labeled object blobs with the label of their new, created tracks; and
 use the existing tracks and the new tracks for labeling object blobs determined in frames of the video data that are subsequent in time to the first frame.

20. The computer program product of claim 19, wherein the different image attributes determined for each of the un-labeled object blobs comprise the object position attribute, the object appearance attribute and the object size attribute; and
 wherein the computer readable program code instructions for execution by the processor further cause the processor to determine the plurality of different attribute costs for assigning each of the un-labeled object blobs to the existing blobs by determining the object appearance cost as the function of the determined object appearance attribute, and determining the object size cost as the function of the determined object size attribute.

* * * * *